United States Patent [19]

Pender

[11] 4,097,008
[45] Jun. 27, 1978

[54] CARGO HANDLING SYSTEM FOR AIRCRAFT

[76] Inventor: David R. Pender, 1018 Marion St., Columbia, S.C. 29201

[21] Appl. No.: 799,172

[22] Filed: May 23, 1977

Related U.S. Application Data

[62] Division of Ser. No. 735,130, Oct. 21, 1976.

[51] Int. Cl.² ............................................. B64D 11/06
[52] U.S. Cl. ............................ 244/118 R; 244/137 P
[58] Field of Search ........... 244/118 R, 118 P, 137 R, 244/137 P; 105/329 R, 344, 4 R; 104/25, 18, 20, 27, 28; 296/64

[56] References Cited

U.S. PATENT DOCUMENTS

| 2,192,207 | 3/1940 | Stahl | 296/64 |
|---|---|---|---|
| 2,674,957 | 4/1954 | Miler | 105/4 R |
| 3,247,947 | 4/1966 | Fox et al. | 104/25 |
| 3,638,576 | 2/1972 | Schauffler | 105/329 R |
| 3,841,510 | 10/1974 | Walton et al. | 244/118 R |

FOREIGN PATENT DOCUMENTS

| 1,918,403 | 11/1970 | Germany | 244/118 R |
|---|---|---|---|
| 858,596 | 1/1961 | United Kingdom | 244/118 R |

OTHER PUBLICATIONS

Astronautics and Aeronautics, Mar. 1973, pp. 37–44, vol. 11, No. 3.

Primary Examiner—Galen L. Barefoot
Attorney, Agent, or Firm—B. P. Fishburne, Jr.

[57] ABSTRACT

An aircraft fuselage with a rear opening door and a pair of tracks in the bottom of the fuselage for a roll-in-roll-out cable train consisting of a series of connected cable cars. The cable cars are constructed so that the floor of the aircraft is part of the cable cars with passenger seats above the floor and baggage compartments attached below the floor. The entire cable train can extend rearwardly of the fuselage and into a separate adjacent building without disconnecting the cable train from the cable drive unit in the aircraft floor.

3 Claims, 13 Drawing Figures

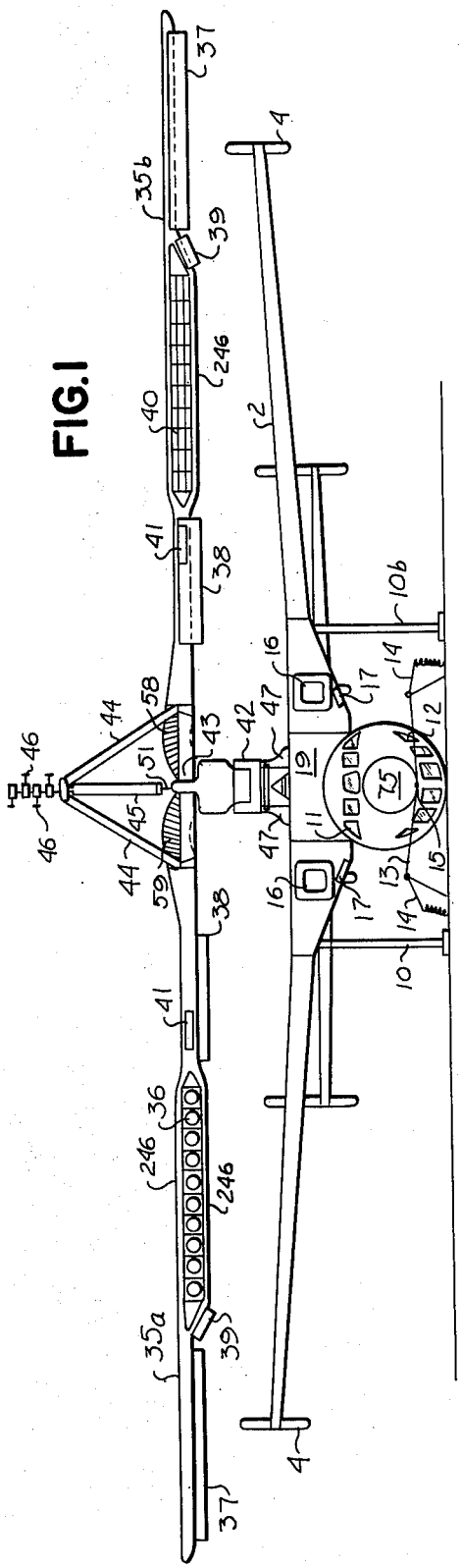
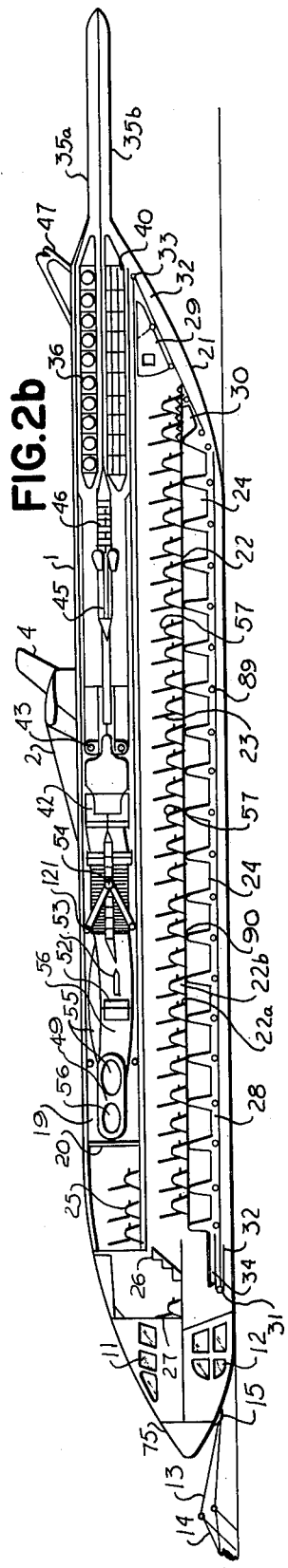
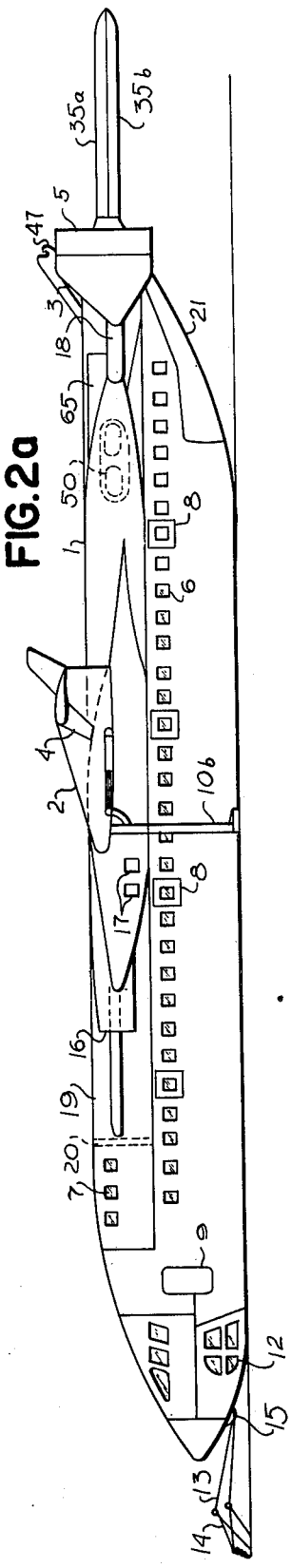

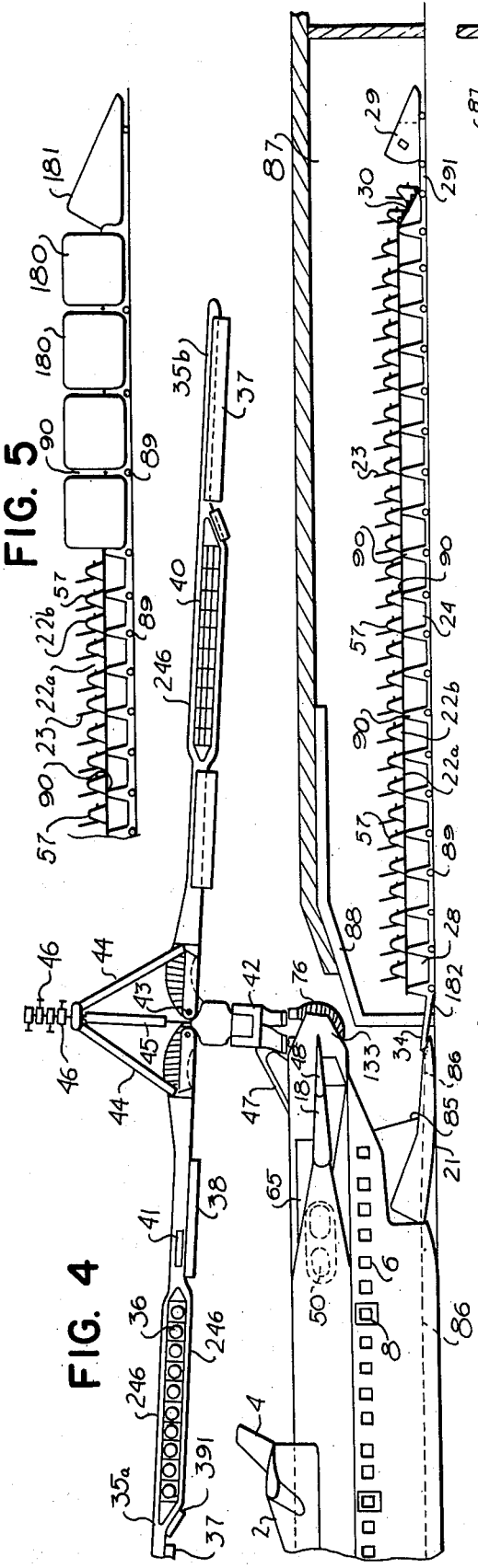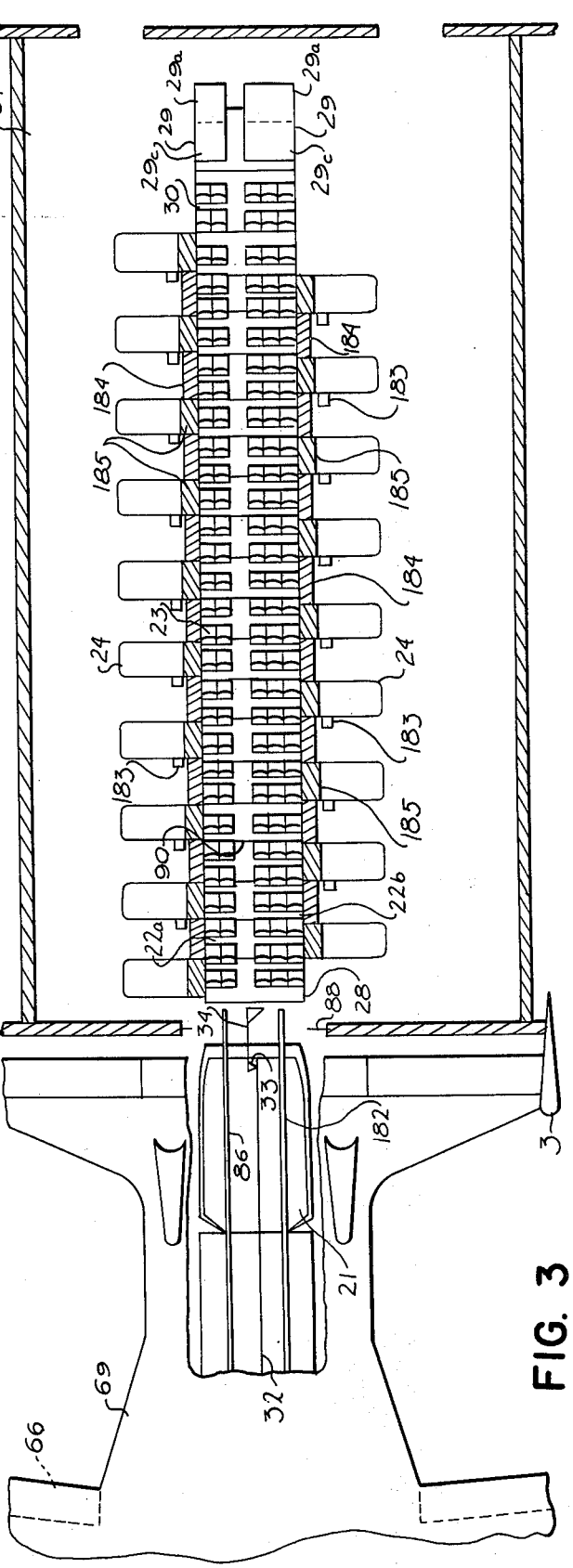

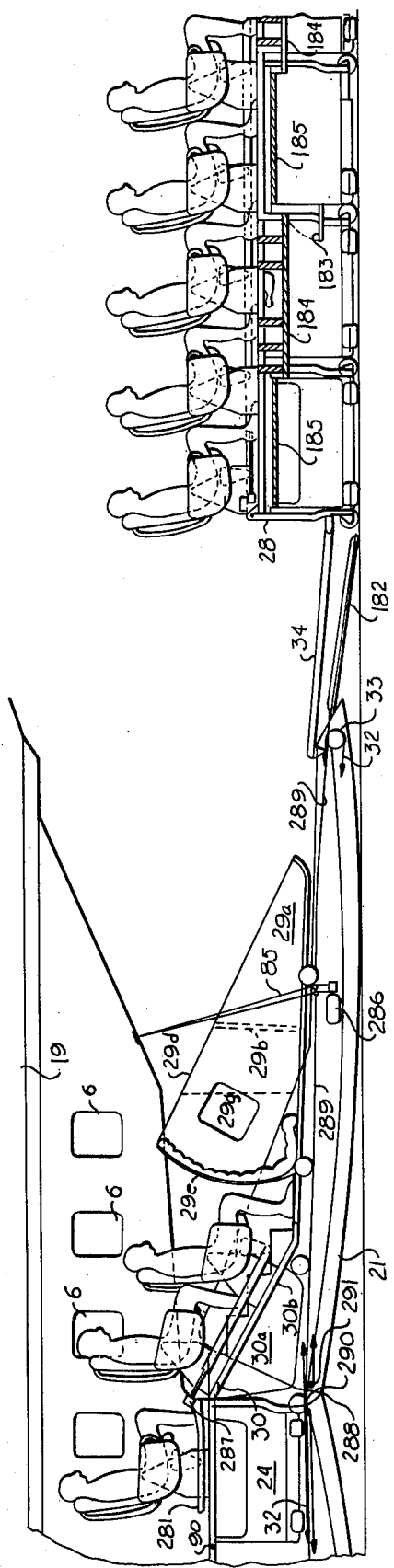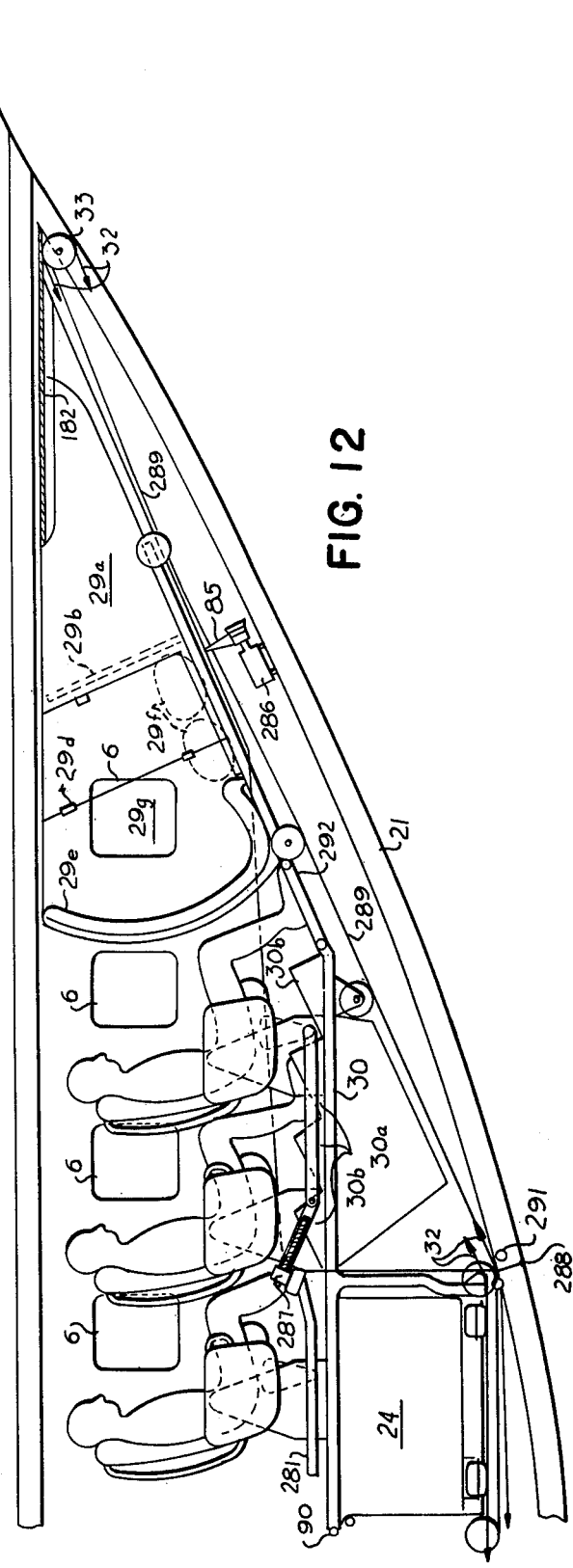

CARGO HANDLING SYSTEM FOR AIRCRAFT

This is a division, of application Ser. No. 735,130, filed Oct. 26, 1976.

BACKGROUND OF THE INVENTION

This invention relates to improvements in aircraft, and more particularly to improvements in vertical takeoff and landing (VTOL) aircraft of the tail-lifter type such as shown in prior patents 3,582,021 and 3,762,667, David R. Pender.

Among the objects of this invention are to improve on the prior art through the provision of a novel and more efficient method and apparatus for space utilization in the aircraft by "packaging" passengers for unloading and loading on a cable train arrangement.

A further object is to provide a much more effective means for handling cargo or cargo mixed with passengers, including a method of quick changing from all-passengers to all-cargo, or any combinations thereof.

According to the invention, the entire aircraft payload-passengers, baggage and cargo-is wheeled in and out of the fuselage through a rear ramp door on a cable train that constitutes a detachable part of the aircraft fuselage.

Other features and advantages of the invention will become apparent during the course of the following description.

BRIEF DESCRIPTION OF DRAWING FIGURES

FIG. 1 is a front view of the aircraft on the ground, showing the rotor unit deployed.

FIG. 2a is a side view of the aircraft with rotor retracted as in fixed-wing flight, but also showing the arrester cable as it would be used for landing and take-off.

FIG. 2b is the same as FIG. 2a, but cut away to show the interior of the fuselage and interior of the stowage tube with rotor.

FIG. 3 is a top view of the rear of the aircraft showing the passenger cable train extended inside the passenger terminal with baggage compartments deployed outwardly.

FIG. 4 is a side view of FIG. 3 which also shows the deployed rotor.

FIG. 5 is a side view of the rear two-thirds of the cable train showing a mixed passenger-container cargo payload.

FIg. 11 is a partial side view of the rear of the parked aircraft, with ramp door open, the left side showing the tail end of the cable train before the cable train is extended and the right side showing the front end of the cable train after it has been fully extended out of the aircraft.

FIG. 12 is a partial side view of the rear of the aircraft, with the rear ramp door closed, showing the tail end of the cable train fitted in the ramp door.

DETAILED DESCRIPTION

The Payload Handling System

1. An Overview of the Payload Handling System

A key feature in the payload handling system is that the entire payload — passengers, baggage or cargo, etc. — is wheeled in and out of the fuselage through a rear ramp door on a cable train that is a detachable part of the aircraft fuselage. The overall concept of the cable train is illustrated in FIGS. 2b, 3, 4 and 5.

The major purposes of this cable train system are:

1. To make it feasible to forego stand-up head room during flight.

2. To make it feasible to forego the need for an interior aisle at certain times so that the interior aisle can be quickly changed, back and forth, as needed from aisle use to passenger seating use.

3. To make it feasible to eliminate the need for checking passenger baggage.

Figure 6:
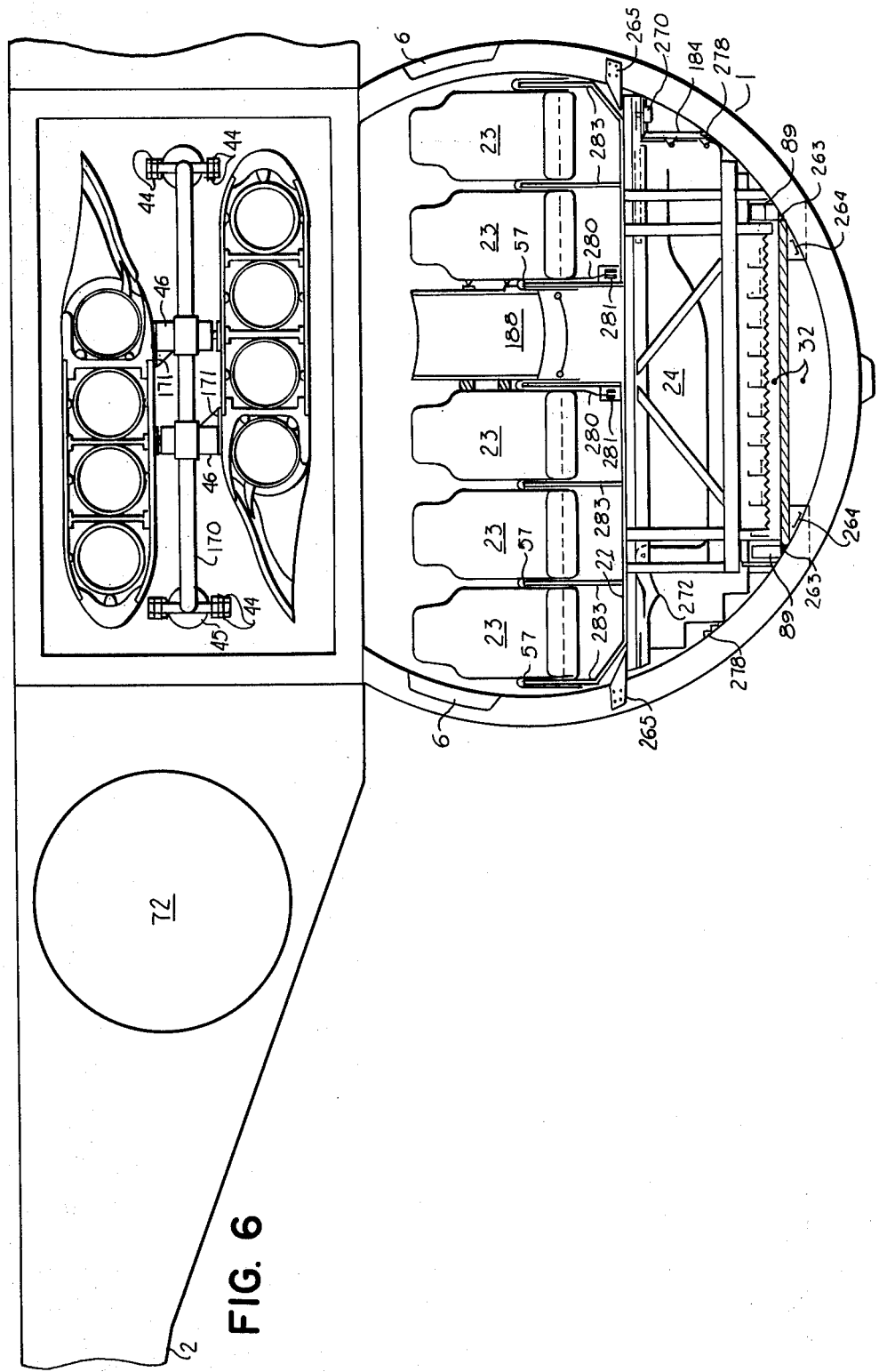
FIG. 6 is a cross sectional view of the aircraft, showing a constant fuselage section and cable train with passenger seats and roll-out baggage container beneath, and also showing a section of the wing, stowage tube, and an inboard cross section of the folded rotor blades.

This cable train concept could be advantageously used on other types of short-haul aircraft, including conventional fixedwing aircraft and conventional helicopters; but the cable train concept appears to be absolutely essential to the economic feasibility of the tail-lifter concept for the following reasons:

(1) The rotor stowage tube takes up about forty percent of the cross sectional area of the fuselage, see FIG. 6. To compensate for this massive rotor stowage area requirement, tradeoffs must be made, and the giving up of head room and sometimes aisle use almost compensates for rotor stowage tube area requirements.

(2) Also, the elimination of expensive and time-consuming baggage checking appears to be an important prerequisite to an efficient center city to center city short-haul VTOL transport system.

(3) To receive full benefit of the cable train system, it must be used in conjunction with the tail-lifter precision landing system, to be further described, which is specific to the tail-lifter concept. This allows the tail-lifter to be landed within a few feet of the passenger terminal door so the cable train can be extended directly into the passenger terminal without the need for ground relocating of the tail-lifter aircraft, and thereby eliminating the need for wheels on the aircraft.

For the above reasons, the cable train should be considered an integral part of the present tail-lifter invention since it appears essential to the economic reduction to practice of the invention.

Part of the understanding of this invention is the perception that the tail-lifter short-haul VTOL can do without stand-up, walk-around head room, and also do without an interior aisle at certain times. The reduction of both head room requirements and interior aisle requirements are interrelated, and are made possible by both the roll-in, roll-out cable train feature and the relatively short time period of each stage length of this short-haul VTOL. With the above comments in mind, this particular passenger handling system appears feasible for the following reasons:

(1) The roll-in, roll-out cable train system eliminates the need for stand-up head room and interior aisles because getting to and from passenger seats takes place outside the fuselage, with passengers loading and departing from the sides of the cable train. The only other normal, non-emergency need for an aisle and enough head room to use the aisle relates to the need to use the lavatory.

(2) The maximum stage length of the short-haul VTOL flight would be about one hour and 15 minutes, with an average stage length of less than 40 minutes. The vast majority of passengers, forwarned of the limited lavatory facilities and limited access to those facilities can make do without them with no great sacrifice. Those few passengers who feel they must use the facilities could sit well forward close to the lavatory and, therefore, would have to disturb fewer fold-away seat passengers. This would be similar to asking theater patrons to stand up to get to empty seats in the middle of the theater. Also, passengers in the upper deck would have easy access to the lavatory as the upper deck aisle has no fold-away seats and is always open.

At least one lavatory appears essential for this VTOL - for crew, emergencies, and those who must use it; but it also appears to be a good policy to make the lavatory slightly inconvenient, considering the flights are usually of short duration.

(3) When the aisle is open, there is enough head room to use the aisle in a slightly bent-over position. The aisle head room is about the same as in small business jets and slightly higher than "micro-buses" and van-type automotive vehicles.

(4) The convertible aisles would always be open when normal load factors are below 80 percent, which would usually be most flights. Also, on the longer short-haul flights, the convertible aisle could be required to remain open, with reduced passenger capacity, and the weight savings of reduced passengers would be traded off for fuel to implement the longer flight.

(5) The concept of short-haul inter-city VTOL transport is strictly utilitarian — no food, no drink or other service, and no standing-up and walking-around.

It might be noted that most smaller general aviation aircraft as well as automobiles have neither stand-up head room nor aisles or toilets and both are designed for non-stop trips substantially longer than the one-hour trips of the short-haul tail-lifter. Also, in terms of maximum and average time, this VTOL stage length is the same order of magnitude as an urban transit bus or subway ride, and these vehicles also have no lavatories, and passengers only stand up when they can find no seats.

(6) An aisle must be provided in case of emergency. The operating practice for the cable train system would be to keep all fold-away seats folded away when not occupied, and only use fold-away seats after all other seats are occupied. Then, in an emergency, or even in normal deplaning, fold away seat occupants would get up and fold their own seats, which would take about five seconds, and the convertible seat area would become an instant aisle for these fold-away seat occupants to file out.

Emergency exit hatches are placed about every sixteen feet, so the maximum distance any passenger would have to travel to an emergency exit would be about eight feet. Therefore, in an emergency, the permanent seat passengers who happened to be next to the emergency side exit doors would get out first, followed by the foldaway seat occupants, and then by the other permanent seat passengers. Since the fuselage is right on the ground, the emergency exits are close enough to the ground so no chutes or other devices are required for the emergency exits.

2. Details of the Cable Train

FIGS. 2b, 3-5, 6, 7, 8, and 9-12 illustrate the payload handling system. It consists of a cable train 22 made up of a series of "cable cars" with passenger seats on top, as shown at 23, and slide-out baggage containers 24 beneath, see FIGS. 3 and 4. The front cable car has four wheels 28; and the in-between cars have two wheels attached to each other similar to a series of 2-wheel trailers with a double or "piano" hinge at the passenger floor 90, allowing movement in only one plane, i.e. the up and down plane, and no significant lateral or sidways movement as would happen with a single-point hinge. As shown in detail in FIG. 11, the front 4-wheeled cable car has a rigid tongue 34 attached to the front cable car which also has a double or 2-point hinge to allow only up-and-down movement of the tongue, with the other end of the tongue attached to an endless cable 32 in the bottom of the fuselage. The endless cable is driven by a cable drive wheel and motor 31 and has a return cable wheel or pulley 33 in the extreme aft end of the rear ramp door 21. There are in-between guide or idler pulleys 291 near the hinge of the ramp door 288 to provide a rolling surface for the cable when the cable bends downwardly as the ramp door is opened.

Again referring to FIG. 11, to unload passengers and baggage, the ramp door 21 is opened via a motor winch 286 in the ramp door, with twin side-winch cables 85 attached to the mating ramp door surface on the fuselage. Ramp door toes 182 are folded down, either mechanically, or by hand, and the cable train drive wheel motor 31 is activated to extend the cable train until the front car 28 is extended just beyond the ramp toes via the cable train tongue 34. As shown in FIGS. 3 and 4, the cable train extends inside the passenger terminal building 87, and an overhead garage-type sliding door 88 can be pulled down to substantially enclose the passengers and keep out noise and inclement weather, and separate the passengers from the aircraft.

Figure 7:
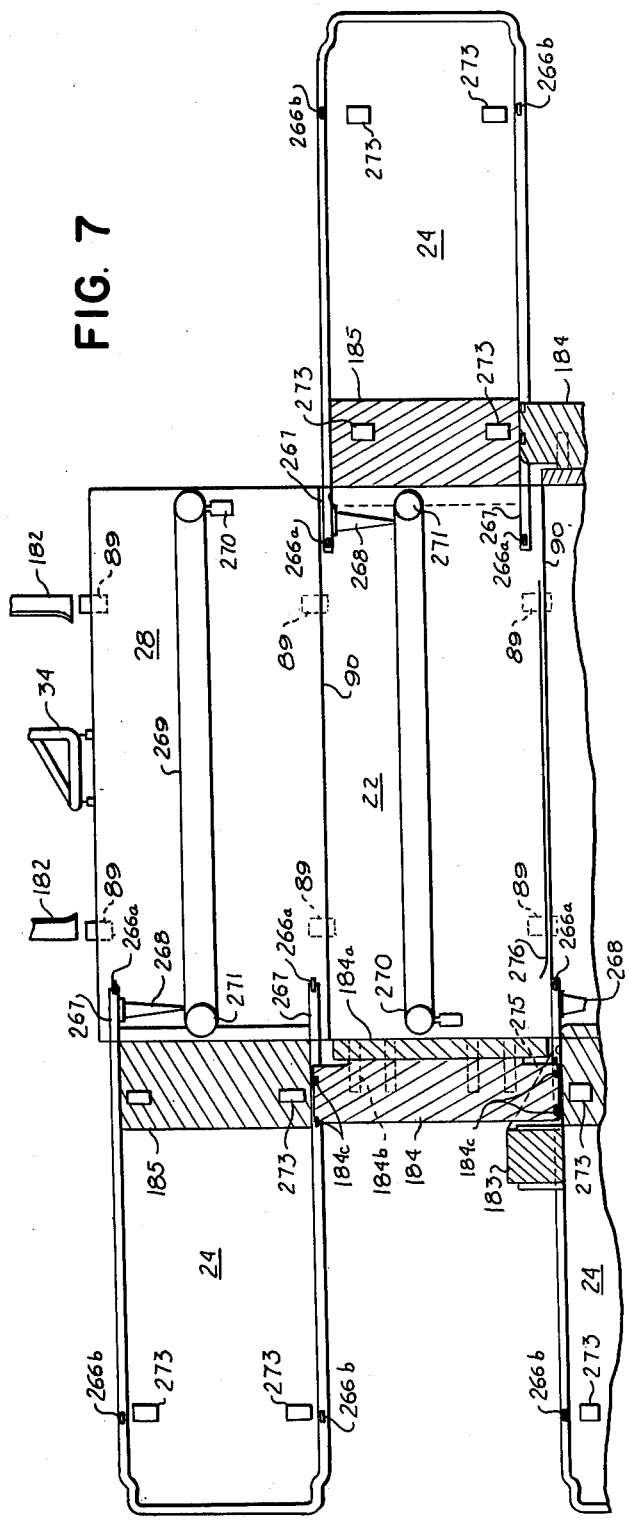
FIG. 7 is a top view of the cable train with baggage units extended.
Figure 8:
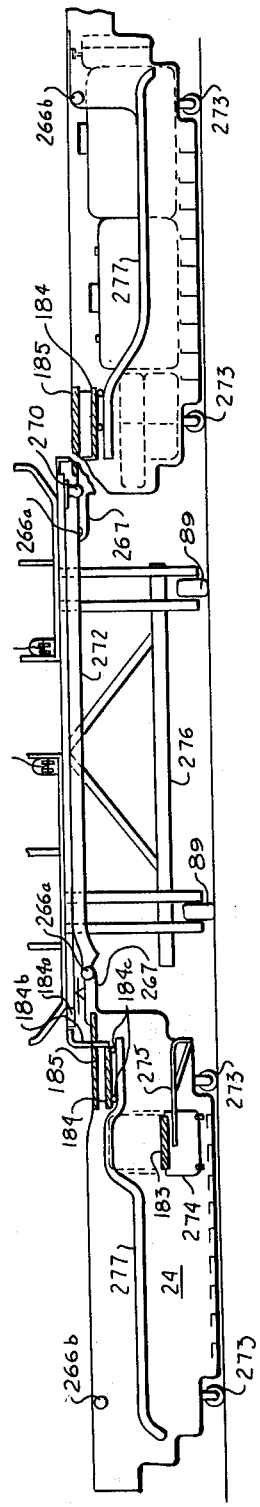
FIG. 8 is an end view of FIG. 7.

Each cable car has a slide-out baggage container 24 beneath the passenger floor (FIGS. 7 and 8). Four rollers 266 are attached to the top of the baggage container that coact with mating tracks 272 beneath the passenger floor. Each baggage container has its own endless cable 269, cable drive pulley unit 270, and return pulley 271 to extend and retract the baggage container which is connected to the cable 269 via the baggage container cable anchor arm 268. The baggage containers are designed so they extend alternately outwardly, left, right, left, right, etc. from the cable train. The ends of the baggage container track 272 curve downwardly so that as the baggage container outer rollers 266b roll out beyond the track they let the baggage container down to ground level so the baggage container wheels 273 meet the ground, and continue rolling, and as the baggage train is fully extended the curved-down end of the baggage container tracks 272 allows the inner baggage container rollers 266a to also roll downwardly until the entire baggage compartment rests solidly on the ground on its four wheels. The inner baggage compartment rollers 266a are attached to baggage compartment inner roller arms 267 to allow the full extension needed for the baggage containers 24.

Passengers get on and off the cable train in the spaces between the alternately extended baggage containers, depositing their baggage in the containers as they board, and picking them up again as they get off at their destination.

Figure 9:
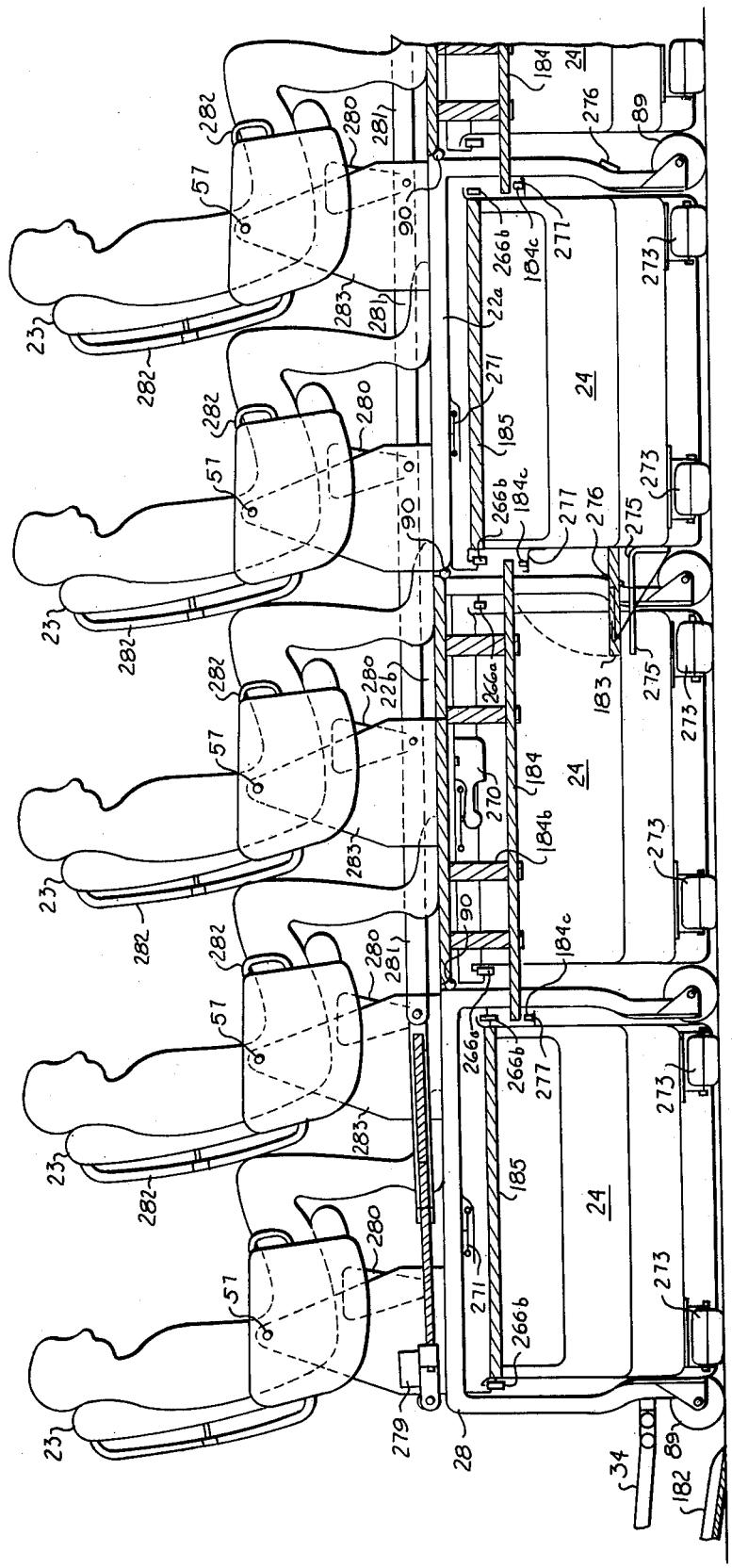
FIG. 9 is a side view of the rear section of the cable train with passengers when fully extended out of the fuselage, with baggage containers extended, alternately left and right from the cable train.

As shown in FIGS. 7, 8 and 9, passenger boarding of the cable train is implemented by: (a) a fold-up step attached to the side of the baggage container 183; (b) a fold-out step-platform 184 which is hinged to the sides of the cable train floor and spans the spaces between the baggage containers; and (c) a built-in platform over the top, inside part of the baggage container 185 which leads to the cable train floor where passengers use (d) the hand holds on the outside seats 282 to aid in getting to their seats on the cable train floor.

The fold-up steps work in the following manner: as the baggage container is retracted, the hinged swing-out actuator arm 275 is forced inwardly by the guide rail 276 which pushes on the hinged passenger step slide-up support brace 274. This pushes the hinged fold-up step 183 upwardly so the fold-up step can fit in the allocated space as the baggage container is retracted. The process is reversed when the baggage container is extended.

The hinged passenger step platform 184 works in the following manner. With the baggage container in the closed position and with the cable train inside the fuselage as shown in FIG. 6, the platform 184 will be held down and under by the fuselage fold-under guide rail 278 as shown in FIG. 6. As the cable train is extended, the hinged platform will swing slightly outwardly, and hang downwardly, as determined by gravity. Reversing the process, as the cable train is retracted back into the fuselage, these hanging step-platforms will be forced further downward and inward by lead-in guide rails at the opening of the rear ramp door (the lead-in portion of these rails is not shown). The platform will again be in the position shown in FIG. 6.

Again assuming the passenger train is out of the fuselage, as the baggage containers are extended outwardly, alternately on the left and right side of the cable train, track units 277 attached to the outside of the baggage container engage rollers 184c on the underside of the platform 184 to push the platform to the position shown in FIGS. 8 and 7, and support the platform in that position. The guide rail or track units 277 curve upwardly in the vicinity of the fold-up steps so the tracks will not be in the way of the steps. This process is reversed when the baggage containers are retracted and the platforms 184 are left swinging downwardly, so they can be folded under when the cable car is retracted into the fuselage.

There are no moving parts in the fixed platform 185 over the baggage container, and no further description is needed.

In order to take full advantage of the tail-lifter VTOL concept, it is designed to land without special ground facilities in any small space, such as on grass or soft ground. In order to roll out the cable train on grass or soft ground, a set of portable track units are attached to the ends of the ramp toes 182 to prevent the relatively small cable train wheels 89 from sinking in the grass or soft ground. The roll-out baggage containers are provided with wide, high floatation wheels 273 to also minimize the sink-in rolling friction problem on soft ground.

There is a cut-out on the rear side of the baggage container, see the right side container of FIG. 8, so passengers will not have to lift baggage so high to deposit or retrieve it. This 'rear' side of the container becomes the top of the container when the fuselage is near the vertical position on rotor flight. This means the weight of the baggage is resting on the front or bottom side of the container during rotor flight.

3. The Seat-Tilting Unit

Figure 10:
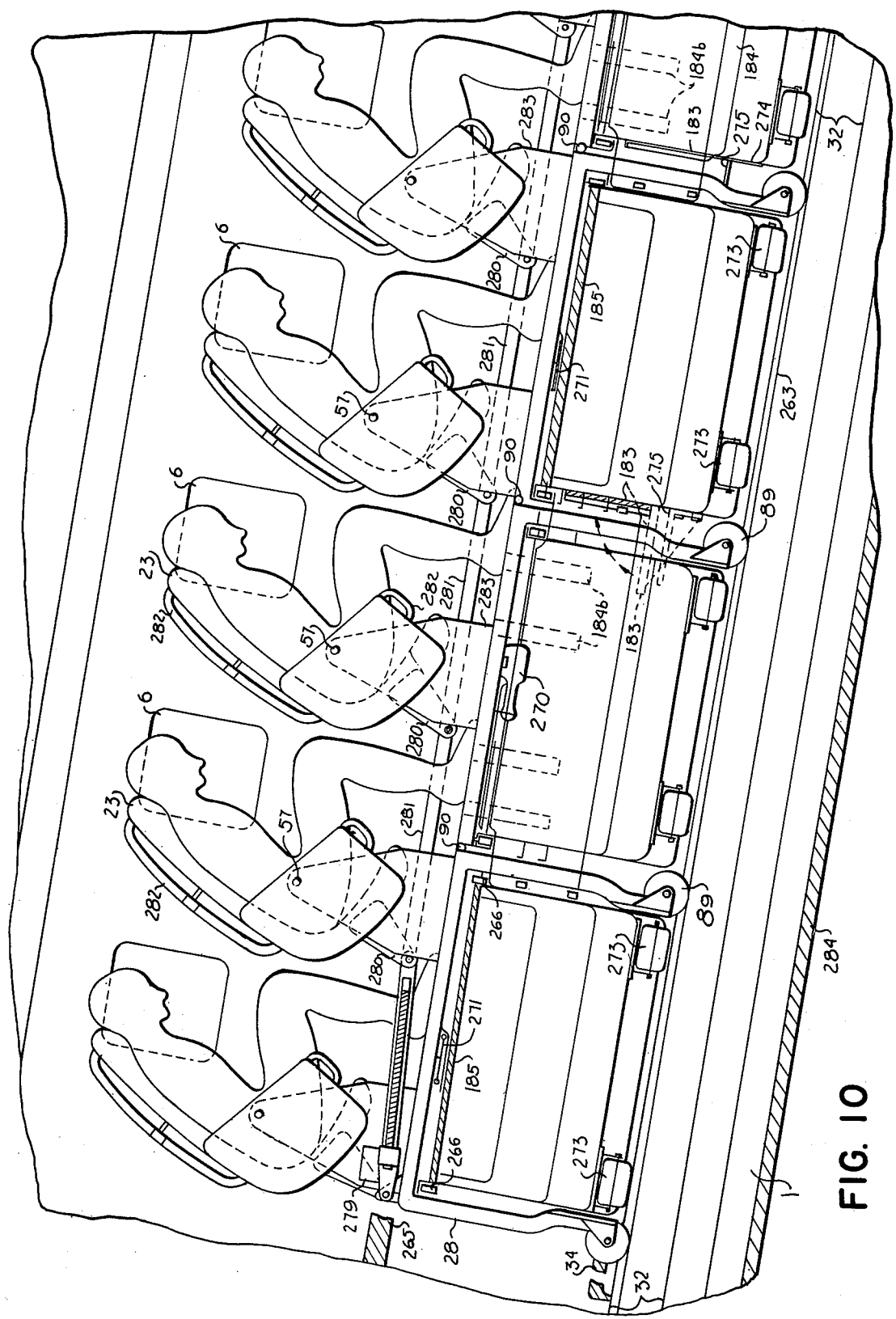
FIG. 10 is a side view of a section of the cable train inside the fuselage, with seats tilted forwardly, as when the aircraft is in rotor flight.

Another important feature of the payload handling system is the tilting of the passenger seats. This is shown in FIGS. 9, 10 and 6. When the aircraft is lifted by its tail and flying on the rotor, the rear-facing seats need to be tilted forward for the comfort of the passengers. The mechanism tilting the seats is a screw actuator 279 with one end anchored to the floor of the forward cable car (although it could be anchored to the floor of any cable car) and the other end attached to a seat tilt lever arm 280 of the adjoining forward seat, as shown in FIGS. 9 and 10. For needed clearance between rows of seats, all seats need to be tilted in unison. To accompish this, all seats in a row operating on a single actuator are joined together so they must tilt together, and each row is connected to every other row via seat tilt connecting rod synchronizers 281, each attached to the lever arm 280 beneath the seat. These connecting rods are placed so that they do not get in the way of the passengers' feet, either to the side of the seat or in the center, so that the passengers' feet straddle the rods 281. When the seats are tilted, they pivot around the seat tilt hinge 57. Since the seat rows on the left and right sides of the aisle are not easily joined, separate actuators and connecting rods are used for seats on each side of the aisle, as shown for arms 280 and rods 281 in FIG. 6. The seat-tilt mechanism should be operated automatically by a gravity level sensing device but could be operated manually, if necessary.

The toilet 78 is one seat designed not to tilt as do the other seats. The toilet is of the recirculating closed system type with chemically treated water, with a filter. The toilet is aligned fore and aft or parallel with the fuselage, with the holding tank to the rear of the seat. On fuselage tilt-up, the fluid in the toilet bowl simply flows rearwardly through the water seal into the holding tank; and on fuselage tilt-down, as in converting to fixed-wing flight, the fluid flows back into the toilet bowl.

Passenger windows 6 are designed for some viewing during all stages of seat tilt but are designed for maximum viewing during forward seat tilt when the aircraft is on rotor flight at low altitude.

4. Interior Aisle and Fold-Away Seats

The convertible aisle seat 188 is shown in FIG. 6. It is a fold-away fabric seat similar in principle to the folding 'director's chair' or folding wheelchair. This folding seat fits into an aisle about the same width as the other seats.

In its most simple form, as shown in FIG. 6, the fold-away seat 188 consists of (a) fabric back with rigid stays sewn into the fabric on each side, and (b) a fabric seat, also with rigid stays sewn into the fabric on each side.

The rigid stays, both back and bottom, are attached permanently to the permanent seats on one side and the rigid stays on the other side, both back and bottom, have quick release hooks or latches that are attached to the permanent seat on the other side of the aisle. To open the aisle, stays on the latch side of the fold-away seats, both back and bottom, are lifted off their latch or hook receivers and deposited in convenient holders on the opposite side of the aisle.

As the permanent seats tilt forward and backward in unison, so do the fold-away seats. The fold-away seats are provided with seat belts as are the permanent seats.

5. Cable Car Length

Another feature of the cable car train is that the length of each cable car is exactly 1.5 times the seat pitch. Seat pitch is defined as the distance from one row of seats to the next row of seats. This means that every other cable car has two rows of seats, and the cable cars in between have one row of seats. To express it differently, odd-numbered cable cars have two rows of seats and even-numbered cable cars have one row of seats, while the distance between all seat rows is always equal and all cable cars have the same length. The reasons for the particular cable car length are twofold:

(1) Cable car length of one seat pitch length appeared too short and of two seat pitch length too long. Cable car length determines cargo container width, and the smaller width container (based on one seat pitch distance) would not adequately accommodate the larger suitcases. The larger width container (based on two seat pitch distance) made it unwieldy and inconvenient for passengers to deposit and pick up their baggage. That is, the average passenger cannot easily reach across the large baggage container (based on two seat pitch length) and deposit or retrieve his luggage. The ideal width baggage container, which appears to be based on a 1.5 seat pitch passenger car, will allow the passenger to reach over and pick up his baggage by standing alongside the baggage container without undue stretching or having to walk in the container and over other luggage.

(2) This second point has to do with the use of a mixed cargo-passenger payload where there is a joining of passenger cable car with cargo container cable car as shown in FIG. 5.

Each cargo container car is equal in length to two passenger cable cars. This means that each cargo container car can be substituted for a two row seat cable car plus a one row seat cable car and vice versa. The cargo container cars, when attached to the rear of the cable train, should always be attached to the passenger cable car with only one row of seats. If this is done, passengers in the last cable car will have ample foot room. If the cargo container cars 180 are attached to the passenger cable cars with two rows of seats, then there will not be enough room between the container unit and the adjacent last row of seats for the passengers' feet, so that row of seats is lost. Also, if all the passenger cable cars were the length of one row of seats or of two rows of seats, there would not be enough passenger foot room to utilize the last row of seats adjacent to the cargo container. The revenue loss of six passenger seats in any mixed passenger-cargo train can be a significant revenue loss over the life of the aircraft.

6. The Tail End of the Cable Train

The cable train requires a rear ramp door, and this must be a relatively large door and takes up about 20 percent of the fuselage length. In most rear ramp door aircraft, this space above the rear ramp door is not generally utilized or is unutilizable. The cable train concept makes this end of fuselage space utilizable, and part of this invention is to design the tail end of the cable train to utilize the space above the rear ramp door.

FIGS. 2b, 3, 4, 5, 11 and 12 illustrate the tail end of the cable train. The transition car 30 starts right at the ramp door hinge line and has two rows of seats, or the same as one-half of the other passenger cable cars. It differs from the other cars in that:

(a) It has limited baggage area due to the curving up of the ramp door, and this baggage area 30a, FIGS. 11 and 12, does not side out but is simply a 'tunnel' area beneath the passenger seats.

(b) The transition car has built-in steps 30b all the way across the width of the transition car. These steps serve as footrests for the rear rows of passengers during flight and as interior aisle steps for rear boarding and departing the train via the interior aisle. This is an alternate or added method of boarding and departing in addition to the side boarding and departing methods previously described. This aisle departure, with the use of the transition car steps, would be one other important exit when the train is not extended out of the fuselage.

(c) The transition car also has a separate variable length connecting rod actuator 287, FIGS. 11 and 12, in order to keep the passenger seats level when the ramp door drops and the transition car floor tilts downwardly. The actuator may be manually operated or operated automatically based on gravity leveling principle.

The final car 29 is designed to utilize the remaining narrowing depth of the fuselage and provides for the continuation of the interior aisle. It has containers on each side of the aisle to fit the available space, and each of the side containers is divided into two compartments. The larger compartment 29c has a built-in curved back seat 29e and is designed for baggage or passengers, as needed. This seat is not tiltable but has a curved back, plus pillows 29f, which enables the passenger to adjust to the varying tilt of the fuselage with a reasonable degree of comfort. It might be considered a child's seat. It has an inside access door 29d and outside window in the compartment 29g that lines up with the rearmost window of the fuselage 6 to allow the passenger to look out.

The rearmost compartment is for baggage only as shown at 29a. The integral toes 182 fold over the top of this rearmost baggage compartment, FIG. 12.

The rear baggage or passenger car 29 has four wheels for stability, identical to the lead car. It is attached to the transition car 30 via a transition — car — rear — car connecting ramp 292, which also serves as a footrest and access walk to that last row of passenger seats on the transition car.

Also, the rearmost car 29 plus the car 30 is substitutable for a larger tail end or cable train rear cargo container 181 to utilize the space above the rear ramp door, as shown in FIG. 5.

7. The Upper Deck Seats

A further innovation for more efficient space utilization is to utilize the front end of the rotor stowage tube for upper deck passenger seats 25 as shown in FIGS. 2b. This front part of the stowage tube becomes part of the pressurized cabin and is separated from the rest of the stowage tube by the bulkhead 20 which contains a stowage tube bulkhead hatch 79, which allows access to the stowage tube. Another hatch 80 on the roof of the upper deck passenger compartment allows access to the top of the aircraft. This upper deck hatch 80 is useful to gain access to the exposed part of the rotor for inspection, maintenance, and for securing or tying down the rotor blades in the fore-aft position while the aircraft sits on the ground. The hatch 80 is also another emergency hatch for upper deck passengers who could leave the aircraft by running down the sloping nose of the aircraft and jumping to the ground. The top hatch could also be used as an exit when the tail-lifter aircraft lands in the water. Access to the upper deck passenger compartment is via stairs 26 as shown in FIG. 2b.

The size of the rotor stowage tube is such that it allows just about the same passenger head room, or slightly more, than the main, lower passenger compartment. The stowage tube width allows for about one less seat than the main lower passenger compartment. Therefore the upper deck has four regular passenger seats compared with five regular seats below. The upper deck has no fold-away aisle seats as does the main deck. Since the upper seats are not on the cable train, the aisle is needed. The upper deck has an off-center aisle with three seats on one side of the aisle and one seat on the other side of the aisle. This arrangement allows the steps to the upper compartment 26 to be off center from the lower aisle so that these steps do not block the lower aisle.

The upper deck passengers would board through the forward door 9, as would the crew, and space in this general area would be provided for carry-on luggage. If there were a need for a first-class passenger area, the upper deck passenger compartment might qualify, having slightly more head room, an aisle always open, close to the lavatory 78, and close to the attendant's seat 27. FIGS. 26 and 36, and being a small 'exclusive' compartment, with a separate 'exclusive' entrance. This small upper deck passenger compartment may be especially useful when the entire lower deck is given over to carrying cargo. The upper deck seats tilt, as do the lower deck seats.

8. Precision Landing System

Part of the payload handling system in the precision landing system, and it is unique to the tail-lifter concept. This system is shown in FIGS. 1, 2a, 2b, 3 and 4. Its components consist of an aircraft arrester cable hook 15 near the nose of the aircraft, and on the ground there is a coacting arrester cable 13 which is anchored to the ground at each end of the cable, FIGS. 2a and 2b. This double-anchored cable is held up off the ground by twin flexible cable support holders 14.

As the aircraft comes in for a landing, the nose of the aircraft is kept a few feet off the ground and slides over the horizontally suspended cable until the aircraft nose hook 15 catches on to the cable and pulls the cable taut. Once the nose hook is engaged, and the fuselage has been tilted about 60° to 70° downward, directional control is actually accomplished with the rotor cyclic pitch control by pulling the tail of the aircraft to the left or right, while the nose of the aircraft is anchored in one spot. As the aircraft fuselage is tilted over in the horizontal position, the pilot lets the aircraft nose touch the ground so that the tail of the aircraft is immediately in front of the airport terminal passenger building 87, FIG. 4. This building is a low-ceiling, single-story building to allow for ample clearance between the rotor and the building. There will be increased ground effect lift beneath that portion of the rotor disc directly above the single story building.

Just prior to landing, the cable 15 is extended via the cable hook actuator unit 15a. This cable hook has a cable safety latch 15b to keep the cable from accidentally sliding off the hook, once the cable is engaged. The latch 15b is automatically positioned by mechanical linkage that engages the safety latch when the hook 15 is extended and removes the safety latch when the hook is retracted. In take-off, when the fuselage is tilted to the vertical position, the cable hook is retracted, which tilts the hook unit downwardly and automatically releases the safety catch and allows the cable to slip off the hook so the aircraft can ascend vertically.

The major advantage of this cable hook system is that the aircraft can land where it is needed, directly in front of the passenger terminal building. The aircraft, being restrained by the arrester cable, can land within feet of any building or obstruction without danger of pilot error or wind gust causing the aircraft to collide or crash into the building or obstruction. This eliminates the need for taxiing or otherwise moving the aircraft, on the ground in normal use. This saves time, fuel, ground-handling personnel, and equipment, and eliminates the need to put landing gear wheels on the aircraft, and allows the fuselage to sit low, directly on the ground, which facilitates loading and unloading through the rear ramp door, and also puts the emergency exit doors close to the ground for quick, simple emergency evacuation. The cable hook can also be used for transporting external payloads on rotor flight over short distances.

In lieu of wheels or other landing gear on the aircraft, ground stability is provided by the retractable on-ground fuselage stabilizer 10. It is shown in the extended position 10b in FIGS. 1 and 2a.

9. Summary of Payload Handling System

The VTOL payload system of the present invention provides for the highest possible passenger density based on:

1. The elimination of stand-up, walk-around head room.

2. The part-time elimination of interior aisles and the substitution of fold-away passenger seats for the aisle.

3. The utilization of space above the tail ramp door for passengers and baggage.

4. The utilization of the forward part of the rotor stowage tube for passengers.

The VTOL payload system provides for the maximum number of payload options including:

1. Maximum passenger density for short-haul, as described in the foregoing paragraph.

2. Reducing passenger capacity by prohibiting fold-away seat use, and keeping aisle open, and trading off reduced passenger weight for greater fuel weight for longer range flights.

3. Quick change, back and forth, for any combination of passengers and cargo by attaching cargo roll-out container car units to the passenger cable car units.

4. The use of an all-cargo container cable train unit in the lower level, with the small passenger compartment in the upper deck.

5. The removal of the entire cable train, to accommodate extra large or extra long cargo directly in the fuselage and thereby eliminate the weight of the cable train.

6. The use of the tail-lifter for rotor flight only, for lifting and transporting external loads, via cable, that are too large to fit in the fuselage.

7. The coordinated use of several tail-lifter aircraft for external lifting of objects too heavy for a single tail-lifter aircraft.

8. The use of the tail-lifter for scheduled city-center-to-city-center use for passenger and/or cargo, using the specially designed city center ports, as described.

9. The use of the tail-lifter for special excursions, vactions, or business, passenger or cargo, to areas that may be remote and have no special port or terminal and no special ground handling facilities.

The present VTOL payload system eliminates all need for baggage checking which provides great cost saving to the tail-lifter VTOL airline, and great time saving, both checking and retrieving, to the passenger.

The combination of the precision landing system, and the roll-in roll-out cable train with no baggage check substantially reduces the on-ground time of the aircraft, which substantially increases the productivity of the aircraft and greatly reduces terminal facility requirements with reduction of both direct and indirect operating cost.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a passenger and cargo handling system for an aircraft, an aircraft fuselage having a rear end ramp door hinged to the bottom of the fuselage to swing downwardly to an open position and upwardly to a closed inclined position, a pair of tracks in the bottom of the fuselage longitudinally thereof, a roll-in-roll-out cable train of cars guidably engaging said tracks, said cars each including a portion which constitutes a floor section of the aircraft and passenger seats above the floor sections and baggage compartments beneath the floor sections, an elongated substantially rigid drive tongue on the forwardmost car of said train, and an endless cable drive means in the fuselage engageable with said drive tongue including a return pulley at the rearmost end of said ramp door and cable guide pulleys at the hinge line of said ramp door with the fuselage, whereby when said cable train is fully extended rearwardly and outside of the fuselage the entire train is disposed rearwardly of the ramp door and adapted to enter an enclosure rearwardly of the aircraft without disconnecting the cable train of cars from said cable drive means in the fuselage.

2. In a passenger and cargo handling system for an aircraft, an aircraft fuselage having a rear end ramp door hinged to the bottom of the fuselage to swing downwardly to an open position and upwardly to a closed inclined position, tracks on the bottom of the fuselage longitudinally thereof, a roll-in-roll-out cable train of cars guidably engaging said tracks, said cars each including a portion which constitutes a floor section of the aircraft and passenger seats above the floor sections and baggage compartments beneath the floor sections, and at least the rear endmost car of said cable train being tapered in a vertical plane rearwardly to fit snugly in the rear of the fuselage above said rear end ramp door when the latter is in said closed inclined position.

3. In a passenger and cargo handling system for an aircraft, an aircraft fuselage having a rear end ramp door hinged to the bottom of the fuselage to swing downwardly to an open position and upwardly to a closed inclined position, tracks in the bottom of the fuselage longitudinally thereof, a roll-in-roll-out cable train of cars guidably engaging said tracks, said cars each including a portion which constitutes a floor section of the aircraft and passenger seats above the floor sections and baggage compartments beneath the floor sections, whereby when said cable train is fully extended rearwardly and outside of the fuselage the baggage compartments of even numbered cars in said train may slide laterally outwardly on one side of the train and the baggage compartments beneath the odd numbered cars may slide laterally outwardly on the other side of said train, allowing passengers to walk between the extended baggage compartments to deposit or pick up baggage, an automatic fold-down first passenger step attached to one side of each baggage compartment for use in cooperation with a second step, said second step comprising a platform placed over an inside top portion of each baggage compartment and used in cooperation with a third step which automatically folds out from beneath each car floor section, and said third step straddling the space between each pair of laterally extended baggage compartments, and hand holds on the passenger seats of said cars to assist boarding and departing passengers in conjunction with said steps.

* * * * *